UNITED STATES PATENT OFFICE.

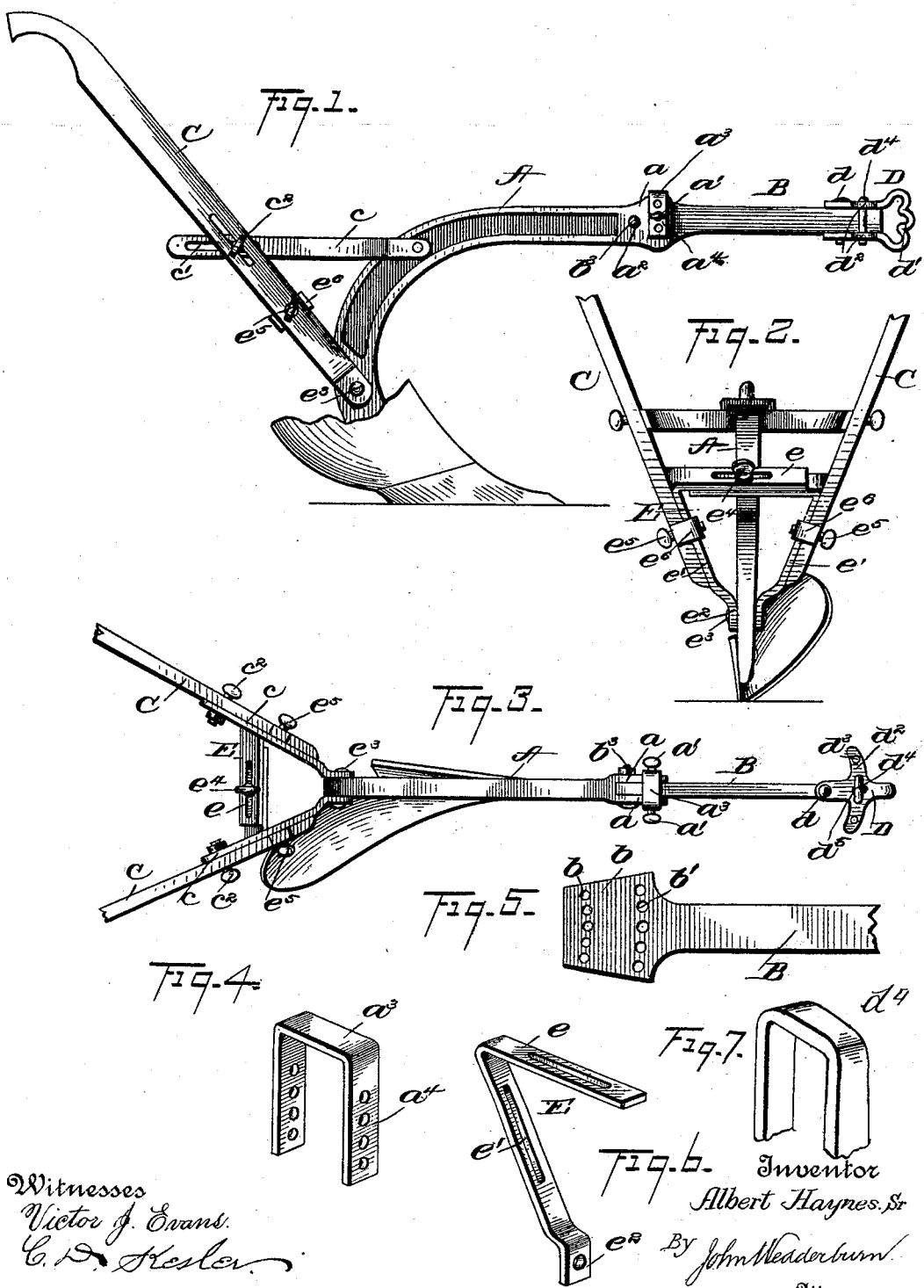

ALBERT HAYNES, SR., OF EZZELL, TEXAS, ASSIGNOR OF ONE-HALF TO J. W. HINCH, OF LAVACA COUNTY, TEXAS.

PLOW-HANDLE.

SPECIFICATION forming part of Letters Patent No. 622,850, dated April 11, 1899.

Application filed January 7, 1897. Serial No. 618,265. (No model.)

*To all whom it may concern:*

Be it known that I, ALBERT HAYNES, Sr., a citizen of the United States, residing at Ezzell, in the county of Lavaca and State of Texas, have invented certain new and useful Improvements in Plow-Handles; and I do hereby declare the following to be a full, clear, and exact description of the invention, such as will enable others skilled in the art to which it appertains to make and use the same.

This invention relates to improvements in plow-handles, and has more particular relation to plows provided with adjustable bars and handles.

The invention consists of certain novel constructions, combinations, and arrangements of parts, all of which will be hereinafter more particularly set forth and claimed.

In the accompanying drawings, forming part of this specification, Figure 1 represents a side elevation of a plow embodying my invention. Fig. 2 represents a rear elevation of the same. Fig. 3 represents a top plan view of said plow. Fig. 4 represents an enlarged detail perspective view of the apertured yoke-piece or beam-support. Fig. 5 represents an enlarged detail side elevation of the plow-beam proper. Fig. 6 represents an enlarged detail perspective view of one of the adjusting-arms connected to the lower ends of the handles, and Fig. 7 represents an enlarged detail perspective view of the loop-pin.

A in the drawings represents the auxiliary plow-beam; B, the beam proper; C C, the handles, and D the clevis.

The beam A is of an approximate segmental shape and is bifurcated at its upper forward end, the two arms $a$ forming said bifurcation being respectively provided with thumb-screws $a'$ and a pin-aperture $a^2$.

The beam proper, B, is provided at its rear end with an enlarged head $b$, formed with a plurality of perforations $b'$ and $b^2$, respectively, the former being for the reception of the inner ends of the screws $a'$, while the latter are adapted for the reception of the securing-pin $b^3$, which is adapted to be passed through the apertures $a^2$. An angular yoke or support $a^3$, having perforated pendent arms $a^4$, is mounted over the upper end of the bifurcated portion of the beam, with the screws $a'$ passed through the proper apertures of the same, according to the adjustment of the plow-beam proper. Should the inner ends of the thumb-screws become broken at any time, this supporting-piece will support the plow-beam in the proper position until the screws can be repaired.

The beam B is provided at its forward end with the clevis D, pivotally connected thereto by a bolt $d$ and formed with a plurality of loops $d'$, adapted for the reception of a hook or link for the attachment of a singletree. This clevis is also provided with two laterally-extending arms $d^2$, formed with a plurality of spaced apertures $d^3$. A staple or loop-pin $d^4$ is adapted to be slipped down through any two of these apertures $d^3$ and about the outer end of the bar B, whereby the clevis is held in any desired position to one side or the other, so that a greater or less width of furrow will be plowed, as desired. The said clevis is also provided with central apertures $b^5$, through which a suitable pin is adapted to be passed when it is desired to adjust the clevis centrally, so that the draft will be even and straight forward. This pin passes through the apertures in said clevis and also through a suitable aperture formed in the forward end of the plow-beam, and it is only an additional means for securing the clevis in its central position.

The handles C are connected together by angular slotted arms E. Each of these arms comprises a horizontal slotted portion $e$, a vertical slotted portion $e'$, and an apertured portion $e^2$, the latter being adapted for attachment to the bottom of the plow-beam A by a suitable clamping-bolt $e^3$. The said arms $e$ are adjustably secured together by a bolt or nut $e^4$ passed through the slots of the same. The handles C are secured to the portions $e'$ by suitable bolts $e^5$ passed through apertured yokes $e^6$ in the slots of said portions $e'$. The said yokes $e^6$ overlap the side of the portions $e'$, and thus prevent the handles from turning on said portion. The upper ends of said handles C are connected to the upper portion of the plow-beam A by bars $c$, the inner ends of said bars being connected pivotally to the respective opposite sides of the beam A, while the outer ends are slotted, as at c, and connected to their respective handles by bolts $c^2$, which pass through said slots and through suitable apertures formed in the handles. It will be observed that by this construction the said handles may be adjusted backward or forward, up or down, or may be spread apart or brought together to any desired extent.

I do not care to limit the application of my invention to plows alone, as the same may be aptly applied to all forms of cultivators and harvesters employing draft-beams and guiding-handles.

By means of the peculiar vertical adjustment of the plow-beam proper the plow may be made to enter the soil to any desired degree, according to the character of the work to be accomplished.

While the construction, operation, and adjustment of the several parts of my invention are very simple and cheap, they at the same time effectively accomplish the objects in view and provide a plow capable of any desirable adjustment to adapt it for all classes of work.

Having thus described my invention, what I claim as new, and desire to secure by Letters Patent, is—

In a plow, the combination with a suitable beam, of spaced handles pivotally mounted upon the same, slotted horizontal bars connecting said handles and said beam, thumb-screws connecting said handles and said bars, angular supports connected to said handles and each comprising an angular casting both arms of which are slotted so that when applied in position two of said arms will overlap, bolts for connecting said overlapping arms and passing through the slots of the same, and means for connecting the remaining slotted arms to the handles, substantially as described.

In testimony whereof I have signed this specification in the presence of two subscribing witnesses.

ALBERT HAYNES, Sr.

Witnesses:
WM. MIZE,
T. J. WILSON.